(12) United States Patent
Lueck

(10) Patent No.: US 7,043,960 B1
(45) Date of Patent: May 16, 2006

(54) SELF-CALIBRATING PRESSURE TRANSDUCER

(75) Inventor: Dale E. Lueck, Merritt Island, FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 41 days.

(21) Appl. No.: 10/873,997

(22) Filed: Jun. 17, 2004

(51) Int. Cl.
G01L 27/00 (2006.01)

(52) U.S. Cl. ....................................... 73/1.63
(58) Field of Classification Search ............... 73/1.63, 73/1.72
See application file for complete search history.

(56) References Cited

U.S. PATENT DOCUMENTS

| | | | |
|---|---|---|---|
| 3,777,546 A * | 12/1973 | Rollins | 73/1.57 |
| 3,782,168 A | 1/1974 | Wiles | |
| 4,257,274 A * | 3/1981 | Shimada et al. | 73/718 |
| 4,377,851 A | 3/1983 | McNamara | |
| 4,384,925 A * | 5/1983 | Stetter et al. | 205/785.5 |
| 4,446,715 A | 5/1984 | Bailey | |
| 4,576,035 A | 3/1986 | Hooven et al. | |
| 4,590,791 A | 5/1986 | Reed et al. | |
| 4,658,829 A | 4/1987 | Wallace | |
| 4,773,269 A * | 9/1988 | Knecht et al. | 73/706 |
| 4,790,192 A * | 12/1988 | Knecht et al. | 73/721 |
| 4,825,685 A | 5/1989 | Breimesser | |
| 4,856,317 A | 8/1989 | Pidorenko et al. | |
| 5,006,835 A | 4/1991 | Griswold et al. | |
| 5,334,304 A | 8/1994 | Maget | |
| 5,377,524 A | 1/1995 | Wise et al. | |
| 5,417,822 A | 5/1995 | Maget | |
| 5,452,753 A * | 9/1995 | Olney | 152/417 |
| 5,483,826 A | 1/1996 | Schultz et al. | |
| 5,485,741 A | 1/1996 | Madison | |
| 5,574,211 A * | 11/1996 | Shimada et al. | 73/1.38 |
| 5,672,808 A | 9/1997 | Klauder et al. | |
| 5,728,933 A | 3/1998 | Schultz et al. | |
| 6,012,336 A | 1/2000 | Eaton et al. | |
| 6,029,524 A | 2/2000 | Klauder et al. | |
| 6,120,457 A * | 9/2000 | Coombes et al. | 600/486 |
| 6,237,592 B1 | 5/2001 | Surjadi et al. | |

(Continued)

OTHER PUBLICATIONS

Richter, Robert, "Measuring Absolute Oxgen Pressure," NASA Tech Briefs, Spring 1984, p. 379.

Primary Examiner—Edward Lefkowitz
Assistant Examiner—George P. Bonanto
(74) Attorney, Agent, or Firm—Randall M. Heald

(57) ABSTRACT

A self-calibrating pressure transducer is disclosed. The device uses an embedded zirconia membrane which pumps a determined quantity of oxygen into the device. The associated pressure can be determined, and thus, the transducer pressure readings can be calibrated. The zirconia membrane obtains oxygen from the surrounding environment when possible. Otherwise, an oxygen reservoir or other source is utilized. In another embodiment, a reversible fuel cell assembly is used to pump oxygen and hydrogen into the system. Since a known amount of gas is pumped across the cell, the pressure produced can be determined, and thus, the device can be calibrated. An isolation valve system is used to allow the device to be calibrated in situ. Calibration is optionally automated so that calibration can be continuously monitored. The device is preferably a fully integrated MEMS device. Since the device can be calibrated without removing it from the process, reductions in costs and down time are realized.

26 Claims, 2 Drawing Sheets

U.S. PATENT DOCUMENTS 6,298,731 B1 10/2001 Wade et al.
6,321,585 B1* 11/2001 Sgourakes .................. 73/1.68
2002/0059972 A1* 5/2002 Rheinhardt .................. 152/418
2005/0222698 A1* 10/2005 Eryurek et al. ............... 700/90

* cited by examiner ical industries, aircraft, automobiles, space travel, etc. A serious problem with pressure transducers is that they need to be calibrated at regular intervals to ensure accurate operation. This usually involves the removal of the transducer from the process being monitored, and taking the transducer to a calibration facility where a series of pressures is applied to the device and its response is compared to the nominal or previous calibration curve. This process will give a certain degree of confidence that the transducer was working during the period since the last calibration, but does not ensure that the transducer will work properly at any time in the future. The removal and calibration is expensive, and the process is either without a measurement during this time or a replacement transducer is installed. Either way, additional costs are incurred either as down time, or the cost of additional transducers.

SELF-CALIBRATING PRESSURE TRANSDUCER

STATEMENT REGARDING FEDERALLY SPONSORED RESEARCH OR DEVELOPMENT

ORIGIN OF INVENTION

The invention described herein was made by employees of the United States Government and may be manufactured and used by or for the Government for governmental purposes without the payment of any royalties thereon or therefor.

FIELD OF THE INVENTION

The present invention relates to a self-calibrating pressure transducer, and more specifically, a pressure transducer having a membrane or fuel cell capable of pumping a known quantity of gas into a chamber to calibrate the transducer in situ.

BACKGROUND OF THE INVENTION

Pressure transducers are used in numerous industries, including refineries, other chem Various technologies involving pressure transducers have been previously disclosed. For example, U.S. Pat. No. 6,298,731, issued to Wade et al., is directed toward a pressure sensor and regulator for direct injection engine fuel systems. The system combines a pressure transducer with a solenoid valve in order to allow direct control of the fuel line pressure. However, the issue of calibration of the transducer is not disclosed.

U.S. Pat. No. 6,029,524, issued to Klauder et al., discloses a pressure transducer having a redundant fluid pressure sensor which can be used to determine whether the transducer needs to be recalibrated. Similarly, U.S. Pat. No. 5,672,808, issued to Klauder et al., discloses a pressure transducer having a redundant fluid pressure sensor that can be used to determine if the pressure transducer needs to be recalibrated. Two readings from separate sensors are compared to indicate whether they may be an error in one, however, no embedded calibration system is suggested.

U.S. Pat. No. 6,012,336, issued to Eaton et al., discloses a micro electro-mechanical capacitance pressure sensor integrated with electronic circuitry on a common substrate. Again, no calibration system is suggested.

U.S. Pat. No. 5,377,524, issued to Wise et al., discloses a self-testing capacitive pressure transducer. However, this disclosure only pertains to low range capacitive pressure transducers, and does not teach or suggest a calibration system as described herein.

Thus, there is a need to develop a pressure transducer having a built in calibration device capable of generating a series of pressures to thoroughly calibrate the device without removing it from the process. Such a calibration system could also be activated whenever the operation of the transducer is in question, as well as for routine calibration.

SUMMARY OF THE INVENTION

In view of the insufficiencies discussed above, it is an object of the present invention to provide a self-calibrating pressure transducer having various features and advantages.

The present invention is an integrated pressure transducer and calibration mechanism, preferably in a silicon MEMS device that allows the self calibration of the pressure transducer on demand. Calibration can be achieved in as little as within a few seconds. It is adaptable to both low and high range pressures, and includes the ability to internally check the performance of the calibrating device with an accuracy compatible with the pressure transducer calibration requirements.

The device includes a pressure transducer membrane which measures the process pressure. Calibration can be implemented on either the working side of the pressure membrane, or on the reference side. In one embodiment, a zirconia membrane is used to pump a known amount of oxygen into communication with an interior chamber. Thus, a known pressure is created. The resulting effect on the pressure membrane can be measured, and repeated measurements can be taken to calibrate the transducer.

In various embodiments, oxygen can be supplied by the surrounding environment, by an oxygen reservoir, or by surrounding carbon dioxide or water via an electrolysis process. The system may be configured with valves to selectively isolate the calibration portion of the device or the process pressure, as desired. The system may also be automated to insure continuous calibration of the device.

In another aspect of the invention, a reversible fuel cell assembly is used to pump gas into a chamber to calibrate the device. A membrane-electrode assembly ("MEA") is used to pump oxygen and hydrogen into the calibration chamber. The oxygen and hydrogen are pumped into separate sections of the chamber, and slack diaphragms communicate the pressure to an interior transducer chamber. Since the fuel cell assembly pumps a known amount of gas into the system, the pressure can be calculated and compared to the transducer pressure readings in order to calibrate the device.

The present invention allows the practical construction of a compact Micro Electro-Mechanical System ("MEMS") device capable of developing a series of pressures to calibrate a pressure transducer incorporated into the same or attached substrate. The basic concept utilizes a Zirconia membrane which is used to pump known quantities of oxygen into a closed chamber attached to the pressure transducer, either a permanent or temporary connection, to allow calibration of the pressure transducer. The zirconia device can act as both an accurate coulometric oxygen pump, and as an oxygen concentration readout device. Thus, a controlled and known quantity of oxygen can be transported into the closed chamber in contact with the pressure transducer's active element to generate a known pressure through the known volume of the captive space, and then, using the potentiometric measurement capability of the same zirconia cell, measure the resulting oxygen concentration within the closed space, giving an independent check on the pressure created with the coulometric pumping. Preferably, an accurate temperature measurement can be incorporated into the gas chamber to correct for any change in the gas temperature.

The gas pressure can be applied to either the working side of the pressure transducer, through suitable isolation valves to remove the effect of the measured process pressure, or to the back side of the transducer to yield an offset to the process pressure. If the process pressure is stable for the duration of the calibration check, then no valving may be required for the latter mode of operation.

The two modes of operation are shown in FIGS. 1 and 2. FIG. 1 shows a simplified schematic with a directly mounted zirconia cell. The oxygen from the surrounding air can be pumped by the zirconia cell into the cavity behind the pressure membrane to offset the working fluid pressure. FIG. 2 shows a more complex system which applies calibration pressures to the working side of the pressure membrane. The oxygen pressure acts through an isolation membrane and valves to remove the influence of the process fluid during calibration. FIG. 2 also incorporates an absolute pressure reference and an oxygen source chamber for use in atmospheres that do not contain oxygen or a gas which can be converted to oxygen by the zirconia cell.

The system can make use of a zirconia amperometric and potentiometric cell to generate and measure oxygen pressure for the purposes of calibrating an integrated or attached pressure transducer. The generation and transport of oxygen using zirconia is well known and is the basis of commercial oxygen sensors. It is likewise known that zirconia can be used in a potentiometric mode to measure the concentration of oxygen with an appropriate oxygen reference concentration present on one side of the cell. Using these properties to generate an oxygen pressure for the purpose of calibrating a pressure transducer has not been previously proposed. The coulometric transport of oxygen allows the exact amount of oxygen transported to be substantially exactly known from the current and time used to do the transport. Coupled with a calibration volume of known size, the resulting pressure can be calculated. The potentiometric measurement allows the direct measurement of the resulting oxygen pressure.

The only requirements are that the current and time of coulometric transport are measured accurately, and the volume and temperature of the enclosed gas are known and measured accurately. In one system it has been found that a resolution of 0.1 mV on the zirconia cell potentiometric readout can detect a pressure change of 0.05%. A zirconia cell of 0.01 square cm can pump enough oxygen to raise the pressure in a 100 micron deep chamber of the same area by 0.58 atmospheres per second. In 10 seconds, this oxygen pumping rate would achieve over 90 psi in the same chamber, and the potentiometric readout would measure that resulting concentration and pressure to 0.5% with a 0.1 mV resolution on the readout.

In another embodiment of the invention, the basic concept utilizes an electrochemical cell which is used to pump known quantities of an electroactive gas into a closed chamber attached to the pressure transducer, either a permanent or temporary connection, to allow calibration of the pressure transducer. The device can act as both an accurate coulometric pump, and as a concentration readout device in some cases. Thus, a controlled and known quantity of gas can be transported into the closed chamber in contact with the pressure transducer's active element to generate a known pressure through the known volume of the captive space. Then, using the potentiometric measurement capability of the same, or another, cell, measure the resulting gas concentration within the closed space, giving an independent check on the pressure created with the coulometric pumping. To increase accuracy, an accurate temperature measurement can be incorporated into the gas chamber to correct for any change in the gas temperature.

Again, the gas pressure can be applied to either the working side of the pressure transducer, through suitable isolation valves to remove the effect of the measured process pressure, or to the back side of the transducer to yield an offset to the process pressure. If the process pressure is stable for the duration of the calibration check, then no valving may be required for the latter mode of operation.

In one embodiment of the invention utilizing the zirconia cell, the zirconia cell is heated to an operational temperature by deposited heater attached to the membrane or its support in intimate contact with the membrane. This temperature would be above 600EC. Once the zirconia begins to conduct, the cell can be operated in one of two modes. In the potentiometric mode, the voltage generated by the cell is related to the ratio of oxygen concentrations across the membrane by the well known Nernst Equation:

$$E = E_0 = (RT/nF)*(\log(P1/P2)) \tag{1}$$

Where P1 and P2 are the partial pressures of oxygen on the two sides of the zirconia membrane. At a temperature of 900EC, the value of RT/nF is about 54 mV for a pressure ratio of 10 (IE per decade of concentration change). In this mode, the oxygen concentration in the calibration chamber can be measured by the output of the zirconia cell.

In the second mode of operation, the zirconia membrane can pump oxygen through the membrane via electrochemical reduction and oxidation of oxygen and oxide ions which are mobile in the heated zirconia. In this mode, the mass transport of oxygen is measured by the current and the time duration of that current. The governing equation in this case is the Faraday relationship:

$$\text{Coulombs of electricity passed} = n*F \tag{2}$$

Which translates to the following for oxygen transport:

$$\text{Amps*seconds (coulombs)} = 4*96482.15 \text{ coul/mole of O2} \tag{3}$$

This relationship allows the precise metering of oxygen through the zirconia membrane. Any current in the milliamp to microamp range is easily applied to the zirconia cell using a constant current source and the time measured with a simple timer circuit. Such coulometric measurements can be done with great precision, with many examples of reproducibility in the 0.01% range or better in the chemical literature.

The initial measurement after conduction starts might be of the current oxygen concentration in the potentiometric mode. For this measurement, the temperature of the zirconia cell must be known to satisfy equation (1) above. The temperature of the gas in the closed cell is also necessary. A precision of 1EC is more than adequate for both temperatures.

Once the beginning oxygen concentration is measured, the coulometric pumping of oxygen can begin. The current level is selected, and the time of generation is precisely measured to achieve the calculated pressure desired. This concentration is then confirmed by another potentiometric measurement. If another pressure level is desired the process can be repeated for as many points as desired. When the calibration is completed, the polarity of the oxygen pump is reversed, and the excess oxygen is pumped out of the calibration chamber with the same precision, and the last potentiometric measurement is done to confirm that the sensor is in the same state as before calibration.

The heat transfer from the hot zirconia to the surrounding gas and transducer must be evaluated with respect to any given situation. Accurate temperature measurements and high temperature materials of construction should alleviate most problems. In one embodiment, the zirconia membrane is about 1 millimeter square. Suitable thermal isolation can be achieved by connecting the calibration gas chamber through a narrow channel.

In the fuel cell assembly embodiments, as shown in FIG. 3, a room temperature reversible fuel cell operates on the following reversible electrochemical reactions in acid media:

$$2\ H_2O \leftrightarrow O_2 + 4\ H^+ + 4e^- \quad (4)$$

$$4\ H^+ + 4e^- \leftrightarrow 2\ H_2 \quad (5)$$

The combined reactions yield the reversible electrolysis and fuel cell reactions of water:

$$2\ H_2O \leftrightarrow O_2 + 2\ H_2 \quad (6)$$

In common practice, these reactions are typically accomplished at room temperature using a PEM (Proton Exchange Membrane) in a Membrane-Electrode Assembly (MEA) using a Nafion membrane for the PEM with electrodes deposited on each side of the Nafion to construct the MEA. By utilizing these room temperature reactions, we can effectively produce a known pressure of oxygen or hydrogen to achieve the same result as the previous example, without the difficulties of the large temperature gradients that are experienced with a zirconia design. As long as the products and reactants are kept in intimate contact with the MEA, the cell can continue to operate in a reversible fashion for an indefinite period of time.

One problem that can arise is that the generation of hydrogen and oxygen (Equations 4 & 5 above) do not produce equal volumes of gas. In a situation where these two gases are evolved into separate chamber (as is desirable from a safety standpoint), the unequal volumes result in unequal or unbalanced pressures across the MEA. Since the MEA is typically quite thin (0.007" or less), this unequal pressure will cause a distortion of the MEA, and an uncontrolled change in the volume and hence the pressures sought for the calibration process. This problem would limit the accurate pressure generation of such a reversible fuel cell to a few tens of psi before substantial errors would arise. By connecting the anode and cathodes chambers of the fuel/electrolysis cell through a flexible ("slack") membrane, it is possible to keep the two reactive gases separated while allowing the two pressures to exactly equilibrate. While this design innovation is not necessary at lower pressures (approximately <30 psia), many pressure transducers operate at much higher pressures where this concept would be necessary for even minimal accuracy. In such circumstances, it is possible to design suitable slack membranes with a low enough spring force as to not significantly impact the calibration process. Such designs for the reversible fuel cell are shown in FIGS. 4 and 5. FIG. 4 incorporates a slack diaphragm which directly separates the two gases, while the design in FIG. 5 utilizes two diaphragms and a fluid filled cavity or capillary between them. This latter feature gives a greater physical separation of the two reactive gases and minimizes the volume each gas must fill. This makes it easier to evolve the amount of gas needed to achieve higher pressures, and improves the safety of the device in circumstances where high pressures of oxygen and hydrogen would otherwise be deemed unsafe.

Calculations of the calibration pressures and times to achieve them with a nominal design of 300 mA current and 0.5 mL are shown in Table 1 below:

| Initial Volumes, Anode & Cathode | | 0.5 | mL | | |
|---|---|---|---|---|---|
| Gas generation Rates | | | | | |
| Oxygen | | 1 | mL/min | | |
| Hydrogen | | 2 | mL/min | | |

| Time of Generation (min) | Total Vol of Oxygen mL | Total Vol of Hydrogen mL | Total Pressure Atm | Vol Anode mL | Vol Cathode mL | Pressure PSI |
|---|---|---|---|---|---|---|
| 0 | 0.5 | 0.5 | 1 | 0.500 | 0.500 | 14.70 |
| 1 | 1.5 | 2.5 | 4 | 0.375 | 0.625 | 58.80 |
| 2 | 2.5 | 4.5 | 7 | 0.357 | 0.643 | 102.90 |
| 3 | 3.5 | 6.5 | 10 | 0.350 | 0.650 | 147.00 |
| 4 | 4.5 | 8.5 | 13 | 0.346 | 0.654 | 191.10 |
| 5 | 5.5 | 10.5 | 16 | 0.344 | 0.656 | 235.20 |
| 10 | 10.5 | 20.5 | 31 | 0.339 | 0.661 | 455.70 |
| 15 | 15.5 | 30.5 | 46 | 0.337 | 0.663 | 676.20 |
| 25 | 25.5 | 50.5 | 76 | 0.336 | 0.664 | 1117.20 |

This spreadsheet calculates the pressure generated in a sealed Echem cell with pressure equalization Other features and advantages of the invention will be apparent from the following detailed description take in conjunction with the following drawings, wherein like reference numerals represent like features.

DETAILED DESCRIPTION OF THE INVENTION

Figure 1:
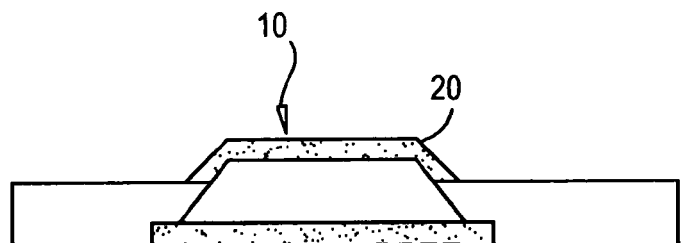
FIG. 1 is a diagrammatic view of one embodiment of the self-calibrating pressure transducer of the present invention showing the calibration on the reference side of the transducer.

While this invention is susceptible of embodiments in many different forms, there are shown in the drawings, and will herein be described in detail, preferred embodiments of the invention with the understanding that the present disclosure is to be considered as an exemplification of the principles of the invention and is not intended to limit the broad aspect of the invention to the embodiments illustrated.

The present invention relates to a self-calibrating pressure transducer 10. The pressure transducer 10 includes a pressure transducer membrane 20. The transducer membrane 20 is affected by a process pressure to be measured in some suitable property, such as a deformation. The resulting change can be measured by transducer measuring means to determine the process pressure from the associated state of the pressure transducer membrane 20. Measurement can be made by a strain gauge, resistance change, piezo-electric measurement, or any suitable manner of determining the process pressure.

An interior transducer chamber 30 is in operable communication with the pressure transducer membrane 20. Operable communication means that the pressure in the chamber 30 would be communicated to the membrane 20, whether by direct contact with the chamber 30, or through other media.

A calibration membrane 40 is provided. The calibration membrane 40 is in operable communication at its interior side with the interior transducer chamber 30, at least when the system is in a calibration mode, either directly or through another one or more chambers. The calibration membrane 40 is capable of enabling a determinable quantity of a calibration substance to pass to the interior side of the calibration membrane 40 to cause a determinable change in a pressure in the interior transducer chamber 30. Determinable quantity means that the quantity can be selected or determined by measurement and calculation. The transducer measuring means can be calibrated using a plurality of transducer measurements associated with a respective plurality of states resulting from a respective plurality of determinable quantities of calibration substance being caused to pass to the interior side of the calibration membrane 40.

In various preferred embodiments, the calibration membrane 40 enables the calibration substance to pass to the interior side of the calibration membrane via a coulometric process. Potentiometric measurement can be utilized to determine the quantity of the calibration substance passed to the interior side of the calibration membrane 40. In various preferred embodiments, the calibration substance is oxygen, hydrogen, or both oxygen and hydrogen.

The calibration membrane 40 of the present invention is preferably a mobile oxide ceramic cell. One particularly suitable membrane 40 is a zirconia membrane 40. Zirconia membranes are well suited to be embedded on silicon substrates.

When oxygen is used as the calibration substance, the oxygen can be supplied by the ambient environment, if available. If oxygen is not available, such as in a vacuum, in space, or in other environments, oxygen can be supplied by an integrated oxygen reservoir 50. Alternatively, oxygen can be supplied by surrounding carbon dioxide or water via electrolysis.

Figure 2:
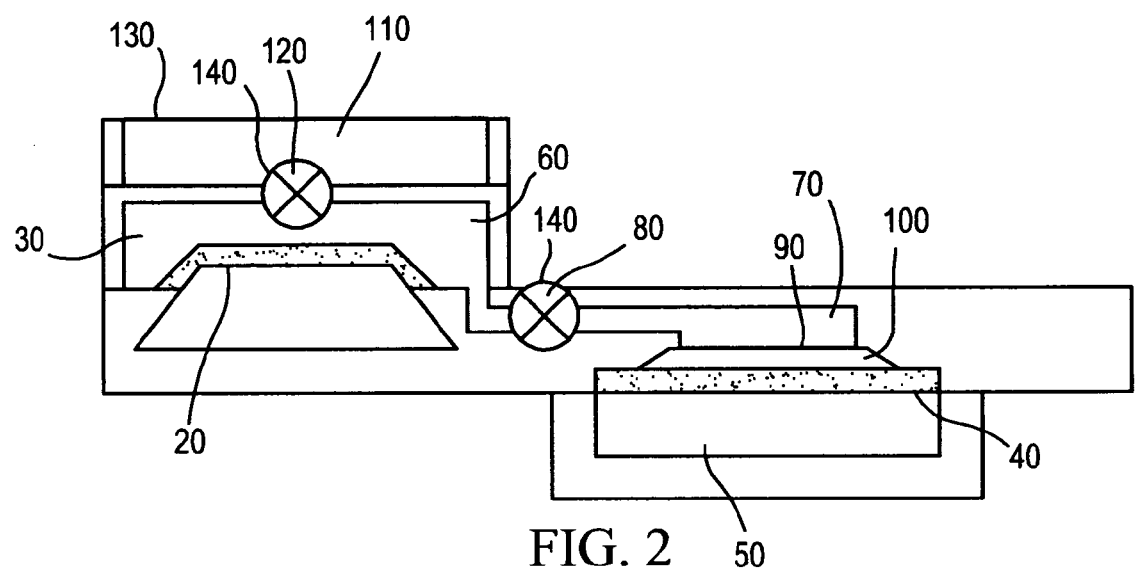
FIG. 2 is a diagrammatic view of another embodiment of the self-calibrating pressure transducer of the present invention, showing an oxygen reservoir and valved system for fluid isolation and calibration on the working side of the transducer.
Figure 3:
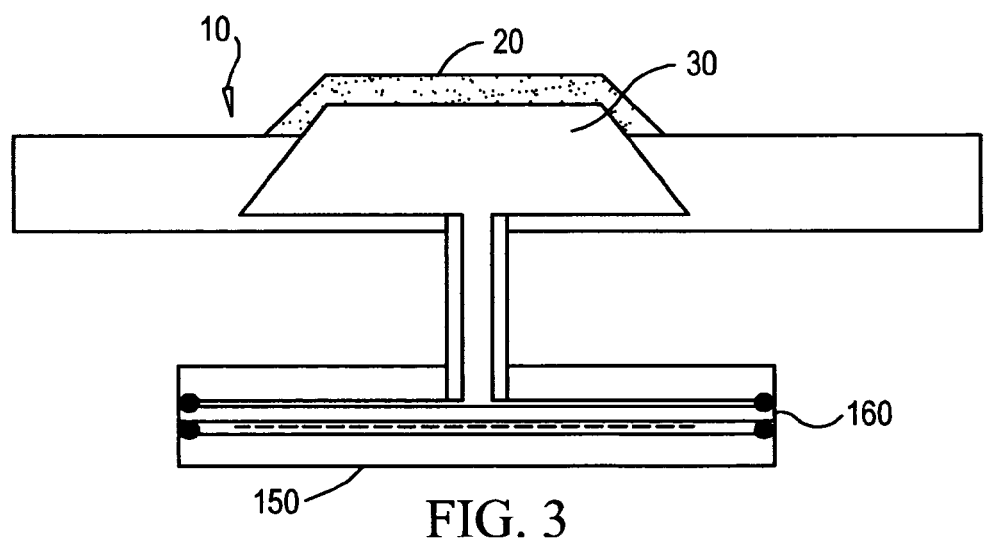
FIG. 3 is a diagrammatic view of another embodiment of the self-calibrating pressure transducer of the present invention, showing a reversible fuel cell assembly having a membrane-electrode assembly.

The calibration of the transducer 10 can be implemented on the reference side of the membrane 20, as illustrated in FIG. 1, via a subtraction calculation, or on the working side, as illustrated in FIG. 2. In various embodiments, as illustrated in FIG. 2, the interior transducer chamber 30 includes a first section 60 adjacent the pressure transducer membrane 20 and is separated from a second section 70 by a first two-way valve 80. The second section 70 is in operable communication with the first section 60 under the condition that the first two-way valve 80 is open. The second section 70 is operably isolated from the first section 60 under the condition that the first two-way valve 80 is closed. The second section 70 is adjacent a calibration isolation membrane 90. The calibration isolation membrane 90 transfers the pressure in the calibration chamber 100 to second section 70. Calibration chamber 100 is between the isolation membrane 90 and the calibration membrane 40.

In a preferred embodiment, the first section 60 and the second section 70 of the interior transducer chamber 30 are substantially filled with a fill fluid. The fill fluid may be any suitable fluid, however, it is preferably a fluid with a low thermal expansion coefficient which is inert and compatible with the process fluids. Fluids such as silicon oils or mineral oils might be used.

The first section 60 of the interior transducer chamber 30 is further separated from a process isolation chamber 110 via a second two-way valve 120. The process isolation chamber 110 is preferably separated from a process having a pressure to be measured via a process isolation membrane or process slack diaphragm 130. The process isolation chamber 110 is also preferably substantially filled with the fill fluid.

Thus, in the calibration mode in which the first two-way valve 80 is open and the second two-way valve 120 is closed, the transducer 10 can be calibrated, and in the operation mode in which the first two-way valve 80 is closed and the second two-way valve 120 is open, the transducer 10 measures the process pressure. The valves 80 and 120 may be replaced with any suitable valve means 140, which can accomplish the same modes of operation, such as a three-way valve 140.

As the temperature of the calibration substances or gases can affect the parameters of the pressure calculations, particularly in higher temperature situations, a temperature sensor is preferably disposed within the calibration chamber 100, or in the internal transducer chamber 30 if fill fluid is not used. Thus, the output from the temperature sensor can be incorporated into calibration of the transducer 10.

In various other embodiments, the valve system described above can be utilized without the need for a separate calibration chamber 100 and second section 70, and without the need for a fill fluid.

The calibration process is ideally automated via a computing device, and is preferably implemented in situ such that the device 10 need not be removed from the system. The device 10 can be calibrated at predetermined intervals, as frequently as desired. If a reading is obtained which does not meet certain expected parameters, the computing device can be triggered to provide an indication of such to an operator so that the situation can be further assessed.

In various other embodiments of the present invention, the calibration gas is provided via reversible fuel cell assembly 150 comprising an electrochemical cell which, at least in a calibration mode, is capable of pumping a determinable quantity of a calibration gas to directly affect the pressure in the interior transducer chamber 30. The transducer measuring means can be calibrated using a plurality of transducer measurements associated with a respective plurality of states resulting from a respective plurality of determinable quantities of calibration gas being pumped by the electrochemical cell. Preferably, the electrochemical pump comprises a membrane-electrode assembly ("MEA") 160. The MEA 160 preferably operates to pump oxygen and hydrogen into the calibration chamber 100 affecting pressure in the interior transducer chamber 30. The oxygen and the hydrogen are preferably respectively pumped into separate sections of the calibration chamber 100. The oxygen and hydrogen are produced by the MEA 160 from a water source, such as water trapped in the chambers adjacent the MEA 160. Alternatively, a water reservoir or environmental source of water can be used, however, in such a configuration, the water source pressures would need to be isolated from the internal pressures of the system such as by allowing the water to feed to the MEA 160 at a water contact side, and using only the opposite side of the MEA 160 as a pressure source for the system.

Figure 4:
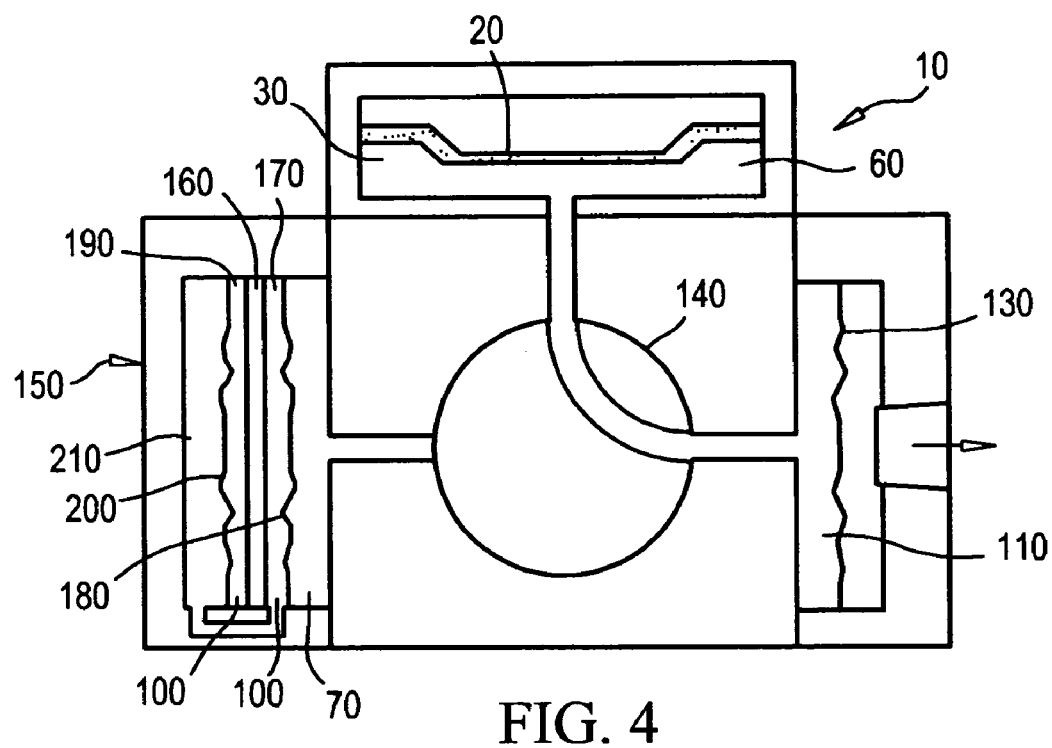
FIG. 4 is a diagrammatic view of another embodiment of the self-calibrating pressure transducer of the present invention, showing a reversible fuel cell assembly having a membrane-electrode assembly and valved system in a gas pressure equalization configuration.
Figure 5:
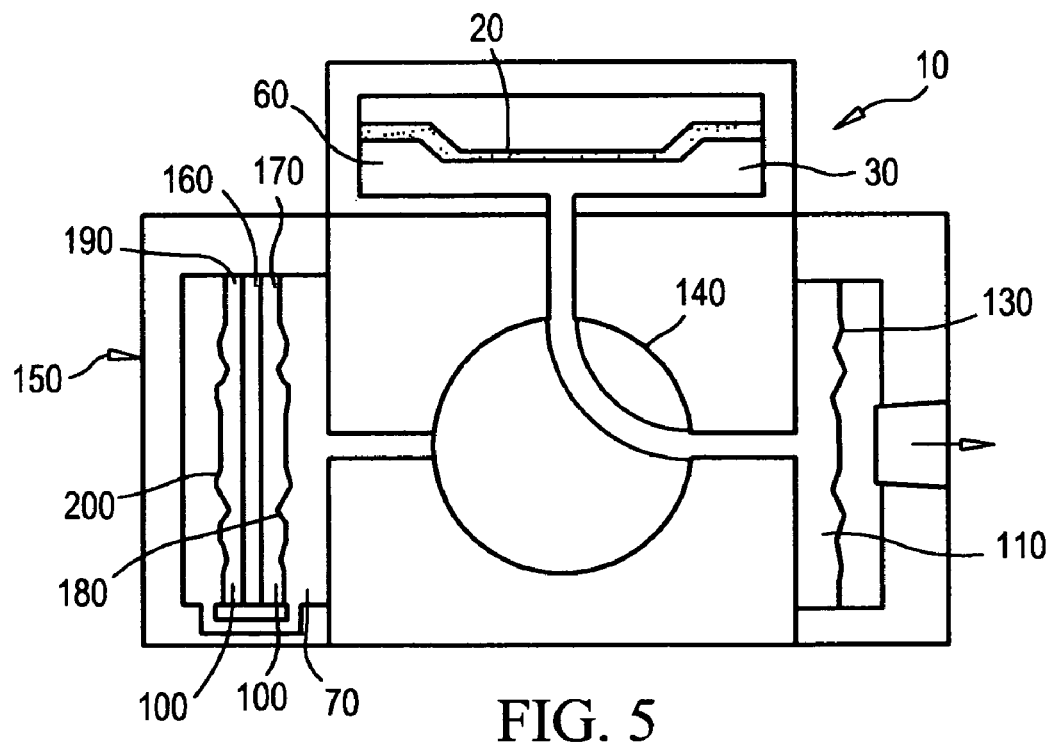
FIG. 5 is a diagrammatic view of another embodiment of the self-calibrating pressure transducer of the present invention, showing a reversible fuel cell assembly having a membrane-electrode assembly and valved system in a fill fluid pressure equalization configuration.

In certain configurations, an oxygen chamber 170 is adjacent a first side of the MEA 160 and bounded by a first slack diaphragm 180, and a hydrogen chamber 190 is adjacent an opposite side of the MEA 160 and is bounded by a second slack diaphragm 200. In one embodiment, as illustrated in FIG. 4, the oxygen chamber 170 is in fluid communication with an equilibrating section 210 which is adjacent a side of the second slack diaphragm 200 opposite the hydrogen chamber 190, the first slack diaphragm 180 being in operable communication with the interior transducer chamber 30. In an alternate embodiment, in which the oxygen and hydrogen are better separated, as illustrated in FIG. 5, the first and second slack diaphragms 180 and 200 are each in operable communication with the interior transducer chamber 30. In either configuration, the interior transducer chamber 30 preferably comprises a first section 60 adjacent the pressure transducer membrane 20, and a second section 70 in operable communication with the calibration chamber 100 via at least one slack diaphragm 180 or 200. A process isolation chamber 110 is adjacent a process slack diaphragm 130 in operable communication with a process pressure to be measured. The first section 60, the second section 70, and the process isolation chamber 110 are substantially filled with a fill fluid and are interfaced via valve means 140 such as a three-way valve 140, or other system of valves, wherein the first and second sections 60 and 70 are in operable communication and isolated from the process isolation chamber 110 in a calibration mode of the valve means 140, and wherein the first section 60 and the process isolation chamber 110 are in operable communication and isolated from the second section 70 in an operation mode of the valve means 140.

As above, the reversible fuel cell assembly 150 preferably enables the calibration gas to pass to the interior side of the calibration chamber 100 via a coulometric process. Potentiometric measurement can be utilized to determine the quantity of the calibration gas passed to the calibration chamber 100. One or more temperature sensors can be used in the calibration chamber 100 to enable an output from the temperature sensors to be incorporated into calibration of the transducer 10. Again, oxygen can be supplied by the ambient surroundings, by an integrated oxygen reservoir, or by surrounding carbon dioxide or water via electrolysis. Also, as above, the interior transducer chamber 30 can be on a side of the transducer membrane 20 opposite the process pressure to be measured, where calibration is achieved via a subtraction process, or it can be on the working side of membrane 20.

As in the embodiments above, the embodiments incorporating the reversible fuel cell assembly 150 can be automated via a computing device and implemented in situ. The calibration can be repeated at predetermined intervals, as desired, and calibration measurements of a selected type can trigger the computing device to provide an indication to an operator.

The device 10 is preferably embedded on a silicon substrate, and may be a micro electromechanical system ("MEMS") device.

While the specific embodiments have been illustrated and described, numerous modifications are possible without significantly departing from the spirit of the invention, and the scope of protection is only limited by the scope of the accompanying claims.

What is claimed is:

1. A self-calibrating pressure transducer for accurately measuring process created pressure, comprising:
    a pressure transducer membrane;
    a calibration chamber including an isolation calibration membrane and containing a quantity of a calibration substance;
    an interior transducer chamber in operable flow communication with both said pressure transducer membrane and said isolation calibration membrane;
    said interior transducer chamber further including a first section in flow communication with said pressure transducer membrane and a second section in flow communication with said isolation calibration membrane, with both said first and second sections of said interior transducer chamber substantially full of a fill fluid;
    a first two-way valve disposed between said first and second sections of said interior transducer chamber, said first two-way valve having a selectable open mode for allowing flow communication between said first and second sections and further having a selectable closed mode for preventing flow communication between said first and second sections;
    a process isolation chamber having a process isolation membrane disposed for deflection by said process created pressure, with said process isolation chamber substantially full of a fill fluid;
    a second two-way valve disposed between said process isolation chamber and said interior chamber, said second two-way valve having a selectable open mode for allowing flow communication between said process isolation chamber and said first section of said interior chamber and further having a selectable closed mode for preventing flow communication between said process isolation chamber and said first section interior chamber;
    said self-calibrating pressure transducer automatically assuming a self-calibration mode responsive to selective positioning of said second two-way valve in said closed mode and selective positioning of said first two-way valve in said open mode, allowing a precisely measurable amount of calibration substance to enter said calibration chamber, thereby deflecting said isolation calibration membrane, forcing fill fluid to pass through said open first two-way valve, impacting and deflecting said pressure transducer membrane with a measurable force comparable to the known deflective force on the isolation calibration membrane, thereby self-calibrating the pressure transducer; and,
    said self-calibrating pressure transducer automatically assuming an operation mode responsive to selective positioning of said first two-way valve in said closed mode and selective positioning of said second two-way valve in said open mode, allowing process created pressure to deflect the process isolation membrane, forcing the fill fluid to pass through the open second two-way valve and impacting and deflecting said pressure transducer membrane in order to measure the process created pressure.

2. The self-calibrating pressure transducer according to claim 1, further comprising an apparatus utilizing a coulometric process for creating precise, measurable changes in the quantity of calibration substance in the calibration chamber, thereby deflecting said isolation calibration membrane, and moving said fill fluid to impact against said pressure transducer with a predetermined, self-calibrating force.

3. The self-calibrating pressure transducer according to claim 1, further comprising an apparatus utilizing a potentiometric process for precisely measuring the quantity of calibration substance in the calibration chamber, thereby confirming the self-calibrating force.

4. The self-calibrating pressure transducer according to claim 3, wherein said calibration substance is oxygen.

5. The self-calibrating pressure transducer according to claim 1, wherein said isolation calibration membrane is a mobile oxide ceramic cell.

6. The self-calibrating pressure transducer according to claim 1, wherein said isolation calibration membrane is a zirconia membrane.

7. The self-calibrating pressure transducer according to claim 1, wherein said isolation calibration membrane and said pressure transducer membrane are each embedded in a silicon substrate.

8. The self-calibrating pressure transducer according to claim 4, further comprising an ambient oxygen source for supplying said oxygen to said calibration chamber.

9. The self-calibrating pressure transducer according to claim 4, further comprising an integrated oxygen reservoir for supplying said oxygen to said calibration chamber.

10. The self-calibrating pressure transducer according to claim 4, further comprising an assembly for supplying, by electrolysis of surrounding carbon dioxide, said oxygen to said calibration chamber.

11. The self-calibrating pressure transducer according to claim 4, further comprising an assembly for supplying, by electrolysis of surrounding water, said oxygen to said calibration chamber.

12. The self-calibrating pressure transducer according to claim 1, wherein said isolation calibration membrane is a zirconia membrane, wherein said calibration substance is oxygen, and further comprising an integrated oxygen reservoir for supplying said oxygen to said calibration chamber.

13. The self-calibrating pressure transducer according to claim 1, further comprising a temperature sensor disposed in said calibration chamber for monitoring changes in temperature of said calibration substance.

14. The self-calibrating pressure transducer according to claim 1, wherein said pressure transducer is remotely directed to assume said self-calibration mode or said operational mode by a computing device.

15. The self-calibrating pressure transducer according to claim 1, wherein said first section of said interior transducer chamber is on an opposite side of said transducer membrane from the process pressure to be measured, whereby self-calibration of the pressure transducer is achieved by a subtraction process.

16. A self-calibrating pressure transducer for accurately measuring process created pressure, comprising:
a pressure transducer membrane;
a process isolation chamber having a process isolation membrane disposed for deflection by said process pressure and substantially full of a fill fluid;
a calibration chamber including an isolation calibration membrane and containing a quantity of a calibration substance;
an interior transducer chamber in operable flow communication with both said pressure transducer membrane and said isolation calibration membrane;
said interior transducer chamber further including a first section in flow communication with said pressure transducer membrane and a second section in flow communication with said isolation calibration membrane, with both said first and a second sections of said interior transducer chamber substantially full of a fill fluid;
a three-way valve in flow communication with said first section of said interior transducer chamber, said second section of said interior transducer chamber and said process isolation chamber;
said three-way valve having a first, calibration mode wherein said first and second sections of said interior transducer chamber are in flow communication with each other and said first section of said interior transducer is not in flow communication with said process isolation chamber;
said three-way valve having a second, operation mode wherein said first section of said interior transducer chamber is in flow communication with said process isolation chamber and said first section of said interior transducer chamber is not in flow communication with said second section of said interior transducer chamber;
whereby selective positioning of said three-way valve in said first, calibration mode allows deflection of said isolation calibration membrane to move fill fluid through said three-way valve, impacting and deflecting said pressure transducer membrane with a measurable force comparable to the known deflective force on the isolation calibration membrane for self-calibrating the pressure transducer; and,
whereby selective positioning of said three-way valve in said second, operation mode allows process created pressure to deflect said process isolation membrane, moving fill fluid through said three-way valve, impacting and deflecting said pressure transducer membrane, thereby measuring the process created pressure.

17. The self-calibrating pressure transducer according to claim 16, further comprising an apparatus utilizing a coulometric process for creating precise, measurable changes in the quantity of calibration substance in said calibration chamber, thereby deflecting said isolation calibration membrane, and moving said fill fluid to impact against said pressure transducer membrane with a predetermined, self-calibrating force.

18. The self-calibrating pressure transducer according to claim 16, further comprising an apparatus utilizing a potentiometric process for precisely measuring the quantity of calibration substance in the calibration chamber, thereby confirming the self-calibrating force.

19. The self-calibrating pressure transducer according to claim 16, wherein said calibration substance is oxygen.

20. The self-calibrating pressure transducer according to claim 16, wherein said isolation calibration membrane is a mobile oxide ceramic cell.

21. The self-calibrating pressure transducer according to claim 16, wherein said isolation calibration membrane is a zirconia membrane.

22. The self-calibrating pressure transducer according to claim 16, wherein said isolation calibration membrane and said pressure transducer membrane are each embedded in a silicon substrate.

23. The self-calibrating pressure transducer according to claim 19, further comprising an ambient oxygen source for supplying said oxygen to said calibration chamber.

24. The self-calibrating pressure transducer according to claim 19, further comprising an integrated oxygen reservoir for supplying said oxygen to said calibration chamber.

25. The self-calibrating pressure transducer according to claim 19, further comprising an assembly for supplying oxygen to said calibration chamber by electrolysis of surrounding carbon dioxide.

26. The self-calibrating pressure transducer according to claim 19, further comprising an assembly for supplying oxygen to said calibration chamber by electrolysis of surrounding water.

* * * * *